United States Patent
Marshall et al.

(10) Patent No.: US 8,522,961 B2
(45) Date of Patent: Sep. 3, 2013

(54) TWO-MATERIAL CONVEYOR BELT MODULE

(75) Inventors: Angela L. Marshall, Harahan, LA (US); Christopher R. Ordeneaux, Prairieville, LA (US)

(73) Assignee: Laitram, L.L.C., Harahan, LA (US)

( * ) Notice: Subject to any disclaimer, the term of this patent is extended or adjusted under 35 U.S.C. 154(b) by 120 days.

(21) Appl. No.: 13/208,043

(22) Filed: Aug. 11, 2011

(65) Prior Publication Data

US 2012/0043184 A1 Feb. 23, 2012

Related U.S. Application Data (60) Provisional application No. 61/375,167, filed on Aug. 19, 2010.

(51) Int. Cl.
*B65G 17/06* (2006.01)

(52) U.S. Cl.
USPC ......... 198/844.1; 198/847; 198/851; 198/957

(58) Field of Classification Search
USPC .............. 198/844.1, 847, 849, 850, 851, 852, 198/853, 957
See application file for complete search history.

(56) References Cited

U.S. PATENT DOCUMENTS

| | | | |
|---|---|---|---|
| 2,909,271 A | 10/1959 | Taylor | |
| 4,832,183 A * | 5/1989 | Lapeyre | 198/699 |
| 4,925,013 A | 5/1990 | Lapeyre | |
| 5,323,893 A | 6/1994 | Garbagnati | |
| 5,377,819 A | 1/1995 | Horton et al. | |
| 5,497,874 A * | 3/1996 | Layne | 198/698 |
| 5,507,383 A | 4/1996 | Lapyere et al. | |
| 5,564,558 A * | 10/1996 | Hampton et al. | 198/850 |
| 5,587,218 A * | 12/1996 | Betz | 428/67 |
| 6,569,290 B2 * | 5/2003 | Johnson | 162/348 |
| 6,695,135 B1 * | 2/2004 | Lapeyre | 198/853 |
| 6,761,264 B2 * | 7/2004 | Steeber et al. | 198/844.1 |
| 6,880,696 B2 * | 4/2005 | Cediel et al. | 198/852 |
| 7,111,725 B2 * | 9/2006 | Marshall et al. | 198/850 |
| 7,134,545 B1 * | 11/2006 | Smith | 198/834 |
| 7,222,730 B2 | 5/2007 | Garbagnati et al. | |
| 7,487,578 B2 * | 2/2009 | Keese et al. | 29/460 |
| 7,559,422 B2 * | 7/2009 | Layne et al. | 198/850 |
| 7,575,113 B2 * | 8/2009 | Sedlacek et al. | 198/850 |
| 7,703,601 B2 * | 4/2010 | DeLair et al. | 198/848 |
| 7,802,676 B2 | 9/2010 | Guldenfels et al. | |
| 7,931,139 B2 | 4/2011 | Nielsen | |
| 2001/0052451 A1 | 12/2001 | Ruoss et al. | |

FOREIGN PATENT DOCUMENTS

| | | |
|---|---|---|
| DE | 8524813 U1 | 2/1987 |
| NL | 1032822 C2 | 8/2008 |

OTHER PUBLICATIONS

PCT/US11/47433, International Search Report and Written Opinion of the International Searching Authority, mailed Dec. 12, 2011, European Patent Office, Rijswijk, NL.

* cited by examiner

*Primary Examiner* — Douglas Hess
(74) *Attorney, Agent, or Firm* — James T. Cronvich (57) ABSTRACT

A two-material conveyor belt module and a method for making it. A conveyor belt module comprises a rigid thermoplastic link substrate topped with a high-friction layer made of a resilient material. A dense array of teeth protrudes upward from the link substrate. The resilient material is overmolded onto the link substrate at a temperature high enough to melt the ends of the teeth. The melted ends of the teeth mix with the resilient material to form a bond firmly retaining the high-friction layer atop the substrate.

17 Claims, 7 Drawing Sheets

TWO-MATERIAL CONVEYOR BELT MODULE

CROSS-REFERENCE TO RELATED APPLICATIONS

This application claims the priority of U.S. Provisional Patent Application No. 61/375,167, "Two-Material Conveyor Belt Module," filed Aug. 19, 2010, and incorporated into this application by reference.

BACKGROUND

The invention relates generally to power-driven conveyors and more particularly to two-material belt modules linked together to form an endless conveyor belt and methods for making those modules.

Modular plastic conveyor belts are constructed of a series of rows of thermal plastic belt modules linked together at hinge joints between consecutive rows. Hinge elements along the leading and trailing ends of each row interleave with the hinge elements of trailing and leading rows. Hinge rods interconnect the interleaved hinge elements to form the conveyor belt.

Most plastic belt modules are injection-molded out of a thermoplastic polymer forming a rigid module body that exhibits low-friction characteristics. In applications requiring a high-friction conveying surface, the low-friction thermoplastic modules are topped with a resilient material, such as a rubber compound or a thermoplastic elastomer, that provides a high-friction conveying surface. The resilient material may be mechanically fastened or molded to the hard plastic base module. U.S. Pat. No. 5,361,893, "High-Friction Plastic Conveyor Belts Having Modular Links Formed by Two Integrated Plastic Materials," Lapeyre et al., Nov. 8, 1994, discloses a high-friction layer molded directly to the flat surface of a hard plastic module body. Molding a high-friction material directly to a flat surface works well for some thermoplastic polymers, but not for others, such as acetal. The bond between the flat bottom of an elastomeric layer and the flat, top surface of a belt module molded of acetal is not strong, and the elastomeric layer is subject to being peeled off. U.S. Pat. No. 7,222,730, "Conveyor with Nonskid Support Surface and Manufacturing Method for Same," Garbagnati et al., May 29, 2007, discloses a skidproof covering made of a high-friction material molded onto projections on a rigid link body at a temperature higher than the softening temperature of the projection material to cause plastic deformation of the projections that originate undercuts to create a mechanical interconnection between the covering and the link body. Because the projections deform irregularly, the mechanical interconnection is not uniform and may be weaker at locations where undercuts are not deep. Furthermore, because the projections, when softened, spread horizontally to create the undercuts, they are not so useful for small-pitch belt modules that do not have much area to accommodate the horizontal spread.

SUMMARY

In one aspect of the invention, a conveyor belt module embodying features of the invention comprises a high-friction layer molded atop a rigid link substrate. The substrate, which is molded out of a low-friction plastic material, has hinge elements at opposite ends. The hinge elements connect with the hinge elements of adjacent link substrates. Teeth arranged in an array stand up from a load-bearing surface between the opposite ends of the substrate. Each tooth has a base proximate the load-bearing surface and a distal tip end. The high-friction layer, which is made of a resilient material, is molded atop the load-bearing surface of the link substrate at a temperature sufficient to melt the tip ends of the teeth in contact with the resilient material while it is being molded onto the substrate. The melted tip ends of the teeth mix with the resilient materials to retain the high-friction layer atop the load-bearing surface.

In another aspect of the invention, a method for making a conveyor belt module with a resilient conveying surface comprises: (a) molding a conveyor belt module substrate with an array of teeth upstanding from a load-bearing surface out of a low-friction first material having a melting temperature; and (b) molding a resilient second material at a temperature above the melting temperature of the first material onto the teeth to melt the tip ends of the teeth to mix with the second material forming a resilient conveying surface layer atop the substrate.

BRIEF DESCRIPTION OF THE DRAWINGS

These aspects and features of the invention, as well as its advantages, are better understood by referring the following description, appended claims, and accompanying drawings, in which:

DETAILED DESCRIPTION

Figure 1:
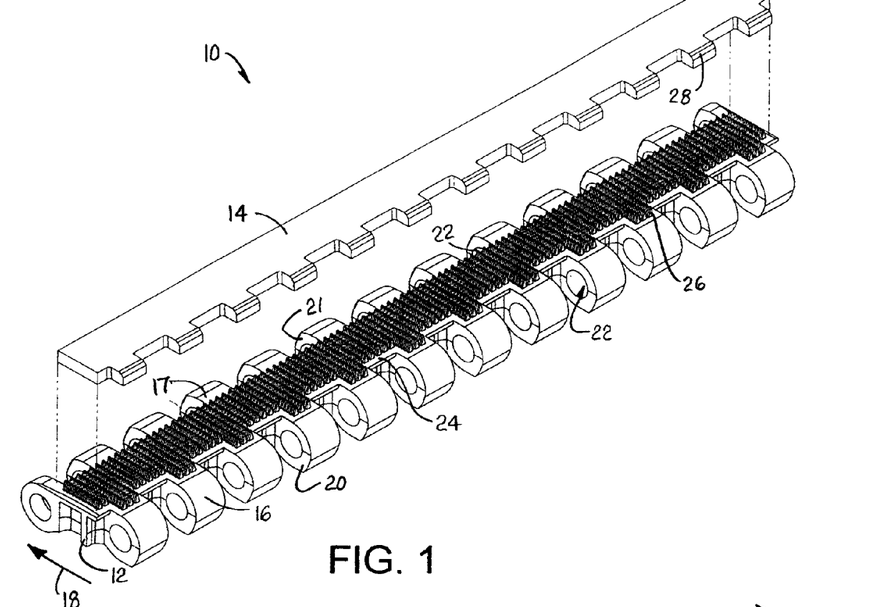
FIG. 1 is an exploded isometric view of a one version of a conveyor belt module embodying features of the invention.
Figure 3:
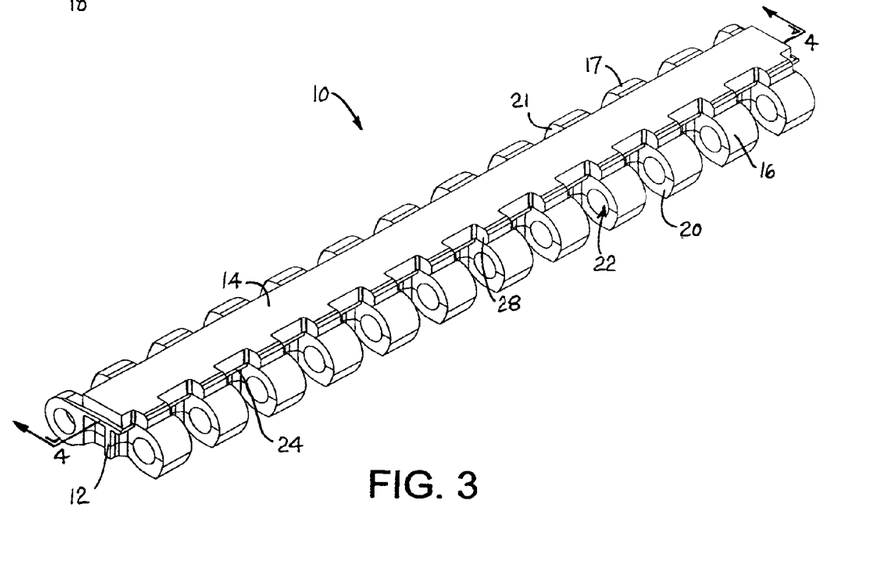
FIG. 3 is an isometric view of the conveyor belt module of FIG. 1.

A two-material conveyor belt module embodying features of the invention is shown in FIGS. 1 and 3. The module 10 comprises a link substrate 12 made of one material and a load-contacting layer 14 made of another material. The link substrate 12 extends from a trailing end 16 to a leading end 17 when the module is installed in a conveyor belt advancing in the direction of belt travel indicated by arrow 18. Hinge elements 20, 21, in the form of hinge eyes with aligned apertures 22, are spaced apart along the trailing and leading ends of the link substrate. A load-bearing surface 24 is formed atop an intermediate portion of the link substrate 12 between the hinge elements at each end. A multiplicity of teeth 26 protrude upward from the load-bearing surface. The link substrate is molded out of a thermoplastic polymer material, such as polyethylene, polypropylene, acetal, or a composite polymer, preferably in an injection-molding process. The thermoplastic polymer material forms a rigid link substrate with low-friction characteristics.

The second material, out of which the load-contacting layer 14 is made, is a resilient rubber or elastomeric material that forms a high-friction layer atop the load-bearing surface 24 of the substrate 12. The high-friction layer 14 is generally rectangular with appendages 28 that extend out onto the tops of the trailing hinge elements 20. The high-friction layer is overmolded onto the rigid link substrate to make a conveyor belt module with low-friction characteristics everywhere except on the outer surfaces of the load-contacting layer 14.

Figure 2:
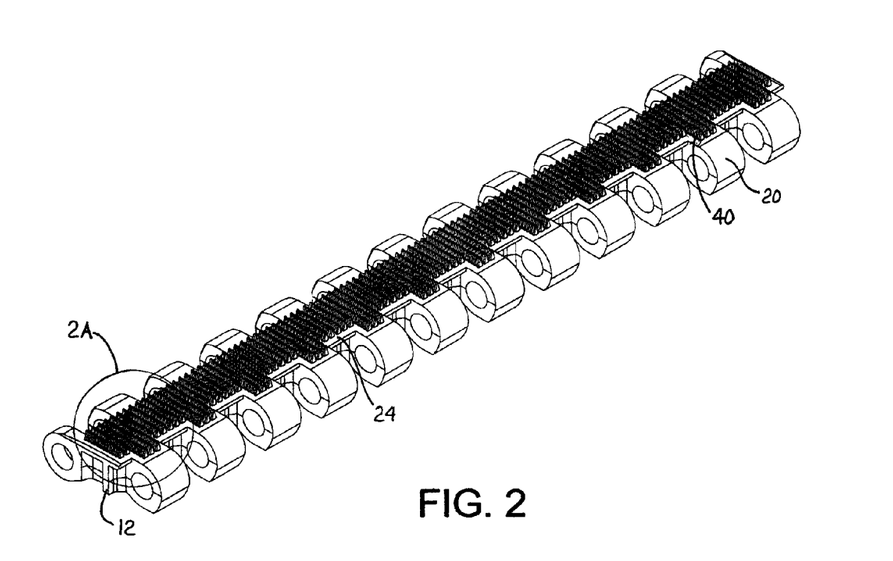
FIG. 2 is an isometric view of the link substrate portion of the conveyor belt module of FIG. 1.
Figure 2A:
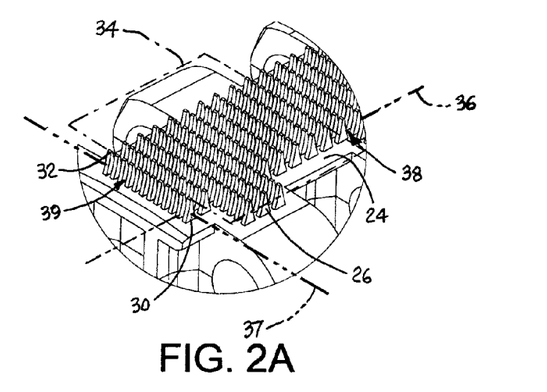
FIG. 2A is an enlarged portion of the link substrate of FIG. 2.

The teeth 26, which are shown in more detail in FIGS. 2 and 2A, are generally triangular in shape and resemble shark teeth. Each tooth extends from a base 30 proximate the load-bearing surface 24 of the rigid link substrate 12 to a vertex at a less massive distal tip end 32 of the triangular tooth. The tip ends 32 of the multiplicity of teeth define a common plane 34. The teeth are arranged in an array of rows 36 and columns 37 separated by a grid of channels 38, 39. The array of teeth 26 resembles a bed of nails upstanding from the load-bearing surface 24 of the link substrate. The teeth are thin so that they can be densely arranged on the substrate. For example, the tooth density may be about 60 teeth/cm². And a portion 40 of the multiplicity of teeth as shown in FIGS. 2 and 2B extends onto the tops of the trailing hinge elements 20 to accommodate the appendages of the high-friction layer.

Figure 4:
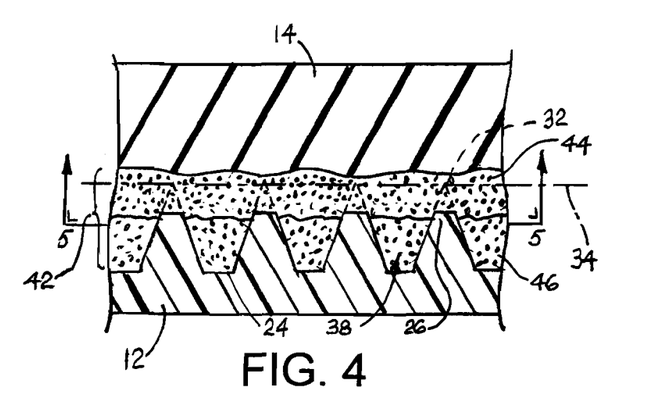
FIG. 4 is an enlarged vertical cross section of a portion of the conveyor belt module of FIG. 3 viewed along lines 4-4.
Figure 5:
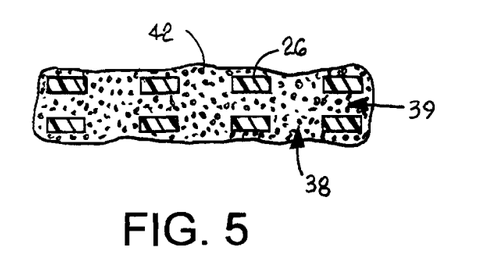
FIG. 5 is a horizontal cross section of the portion of the belt module of FIG. 4 viewed along lines 5-5.

As shown in FIGS. 4 and 5, when the resilient high-friction layer 14 is overmolded onto the rigid link substrate 12 at a temperature higher than the melting temperature of the low-friction material of the substrate, the less massive distal tip ends 32 of the teeth melt and mix with the resilient material surrounding the teeth 26 in a mixed region 42 around the level of the plane 34 formed by the distal ends of the teeth before they are melted. An upper portion 44 of the mixed region contains a majority of the melted tip ends 32 of the rigid substrate material mixed with the elastomeric material. A lower portion 46 of the mixed region 42 contains mostly elastomeric material with little or none of the melted plastic from the tip ends of the teeth. The temperature of the elastomeric material being overmolded is high enough and applied long enough to melt just the tip ends without melting the entirety of the teeth. Thus, as shown in FIG. 5, the teeth 26 impale the high-friction layer in the mixed region and provide a lot of contact area in the channels 38, 39 between the unmelted lower portions of the teeth and the resilient material. And the mixture of the melted plastic tip ends of the teeth with the resilient material in the upper portion 44 of the mixed region 42 forms a firm bond retaining the high-friction layer 14 to the rigid link structure 12. The regular array of rows and columns of teeth further facilitates the flow of the resilient material onto and through the teeth during overmolding. And the flow of the resilient material along the channels between the teeth causes the material of the melted tip ends to string out in the direction of the flow along the substrate.

Figure 6:
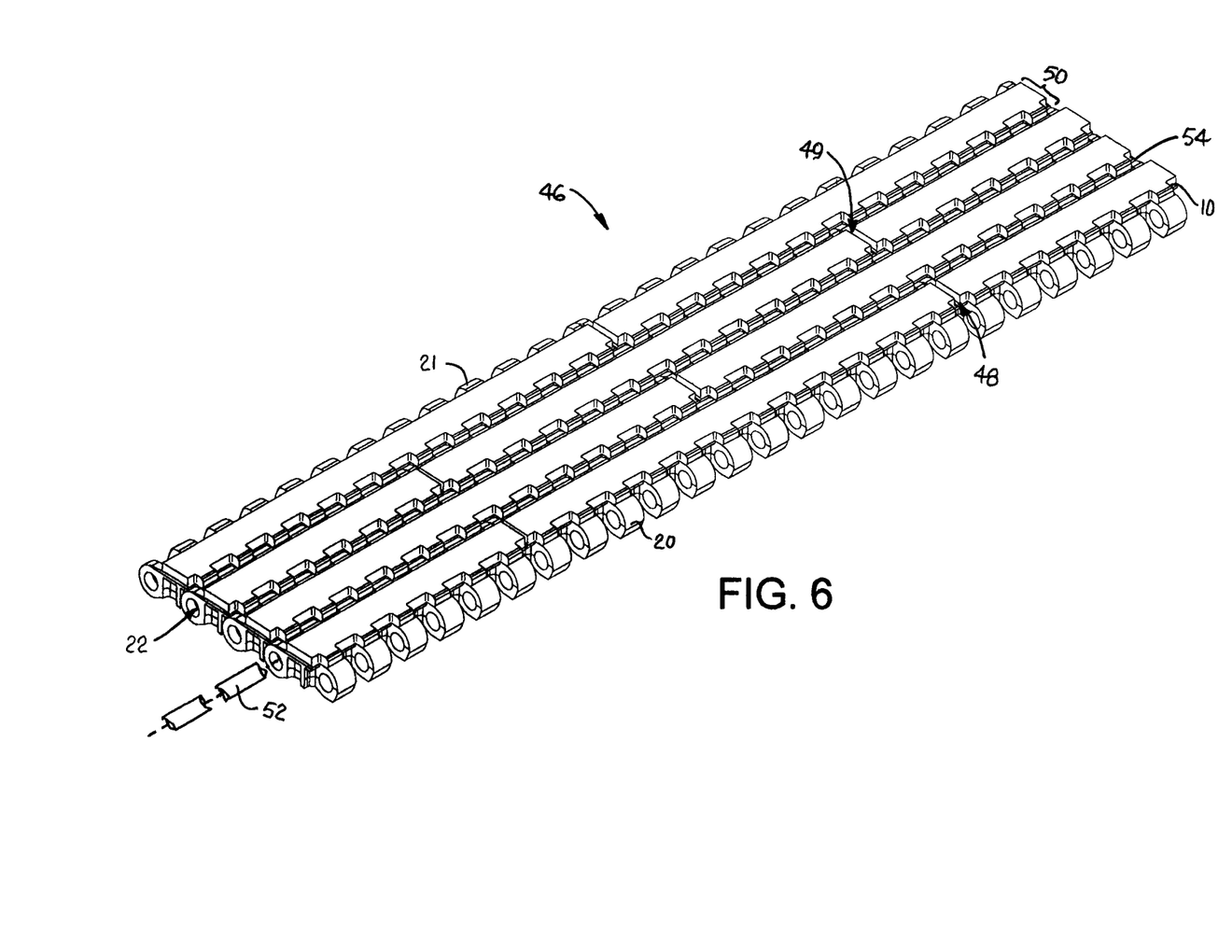
FIG. 6 is an isometric view of a portion of a conveyor belt constructed of conveyor belt modules as in FIG. 3.

As shown in FIG. 6, the two-material conveyor belt modules 10 are conventionally connected together side-by-side and end to end to form a modular conveyor belt 46. The belt shown is constructed in a bricklay pattern with offset seams 48, 49 between side-by-side modules from row to row. Modules of different widths are used to construct the bricklaid belt. (A belt made of identical-width modules could be made with one module per row of belt modules or with continuous seams running along the length of the belt.) The hinge elements 20 along a trailing edge of the link substrate portions of the modules in each row 50 of belt modules interleave with the offset hinge elements 21 along a leading edge of a trailing belt row. The aligned hinge eyes 22 form a lateral passageway through the belt that receives a hinge rod 52 that connects the rows of modules together and forms a hinge 54 with the interleaved hinge elements at which the belt can articulate about sprockets and return rollers and shoes.

Figure 7:
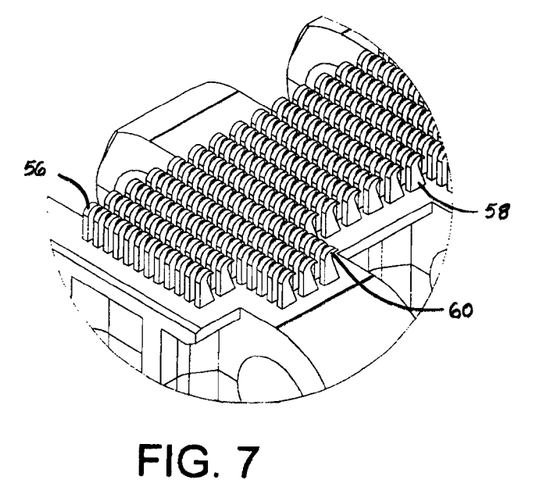
FIG. 7 is an enlarged isometric view of another version of tooth having hooked ends usable in a conveyor belt module as in claim 1.

Another version of tooth structure is shown in FIG. 7, in which the distal top end 56 of each tooth 58 is bent to form a hook 60. The hook shape provides more tooth material available at the tip end for bonding with the high-friction layer than the triangular teeth 26 of FIG. 2A provide.

Figures 8, 8A:
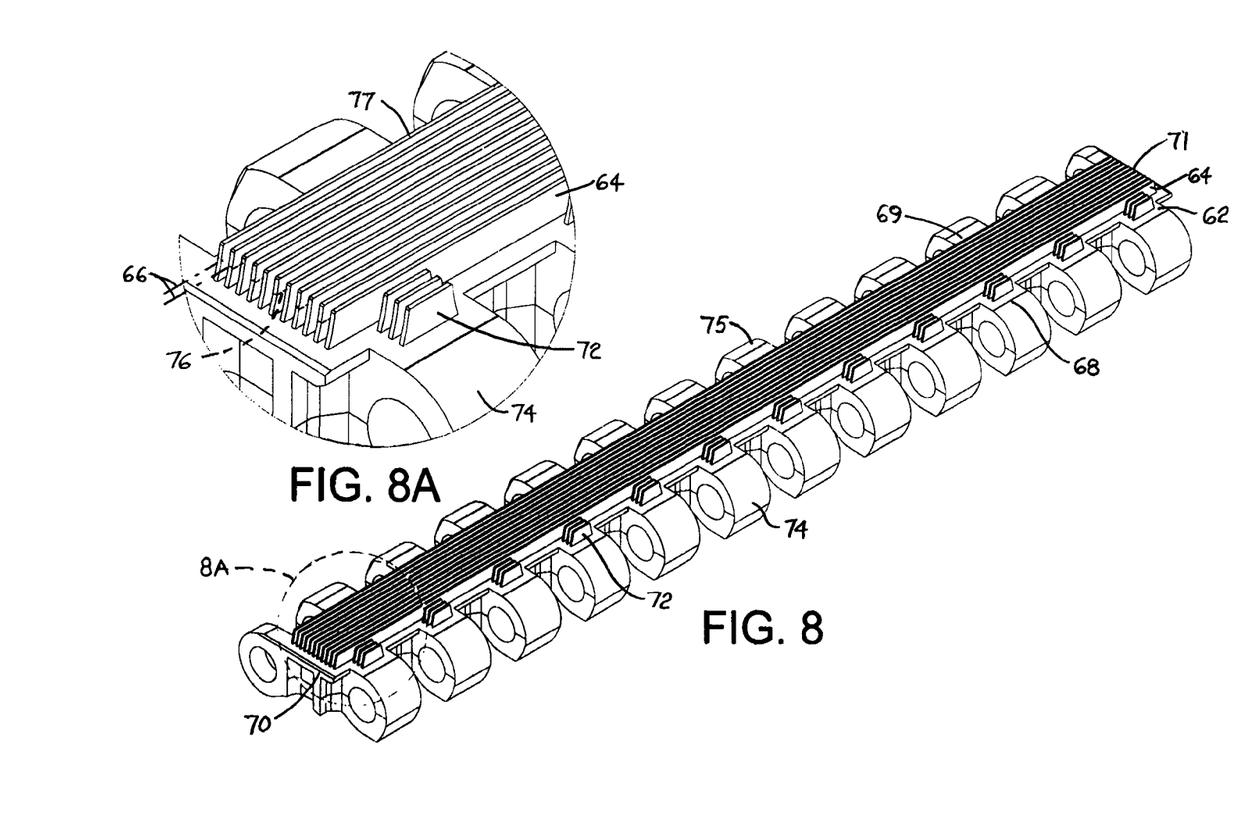
FIG. 8 is an isometric view of another version of the rigid link substrate portion of a belt module embodying features of the invention including elongated teeth extending across the width of the substrate.
FIG. 8A is an enlarged view of a portion of the link substrate of FIG. 8.

Another version of link substrate is shown in FIGS. 8 and 8A. The rigid substrate 62 has an array of elongated teeth 64 arranged in parallel rows 66. Each row extends parallel to the opposite ends 68, 69 of the substrate along the substrate's width 62 from a first side 70 to an opposite second side 71. Tip ends 77 of the teeth form ridges. Slightly elongated teeth 72 are formed atop hinge elements 74, 75 at each end. It would also be possible to have shorter teeth on alternate rows as indicated by the phantom lines 76 in FIG. 8A. A high-friction layer is molded onto the link substrate just as in the other versions. The tip ends 77 melt and meld with the high-friction layer.

Figure 9:
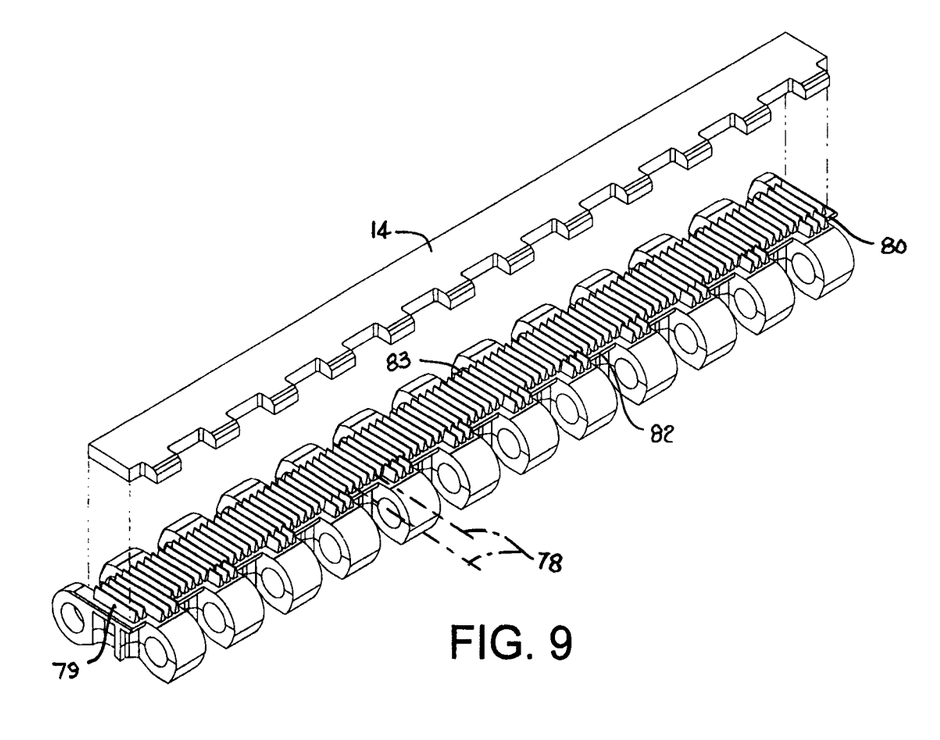
FIG. 9 is an exploded isometric view of yet another version of a belt module embodying features of the invention including elongated teeth extending along the length of the belt module.

Another version of elongated tooth is shown in the conveyor belt module of FIG. 9. In this version, parallel columns 78 of elongated teeth 79 are formed on a substrate 80. Each column extends along the length of the substrate perpendicular to the substrate's opposite ends 82, 83. The high-friction layer 14 is molded onto the substrate 80 as described for the other versions.

Figure 10A:
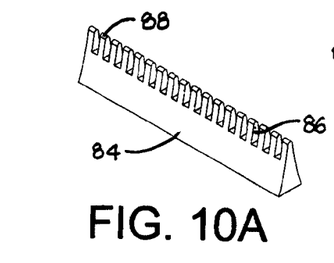
FIGS. 10A and 10B are isometric view of other versions of teeth having a castellated structure.
Figure 10B:
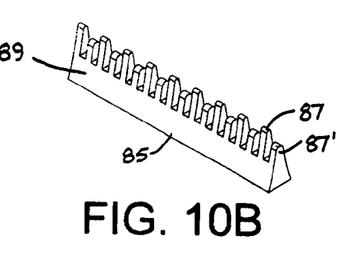

As shown in FIGS. 10A and 10B, the elongated teeth of FIGS. 8 and 9 may be castellated. In FIG. 10A, an elongated tooth 84 has merlons 86 of equal height along the tip end 88 of the tooth separated by gaps. In FIG. 10B, an elongated tooth 85 has alternating tall and short merlons 87, 87' protruding upward from a base portion 89.

Figure 11:
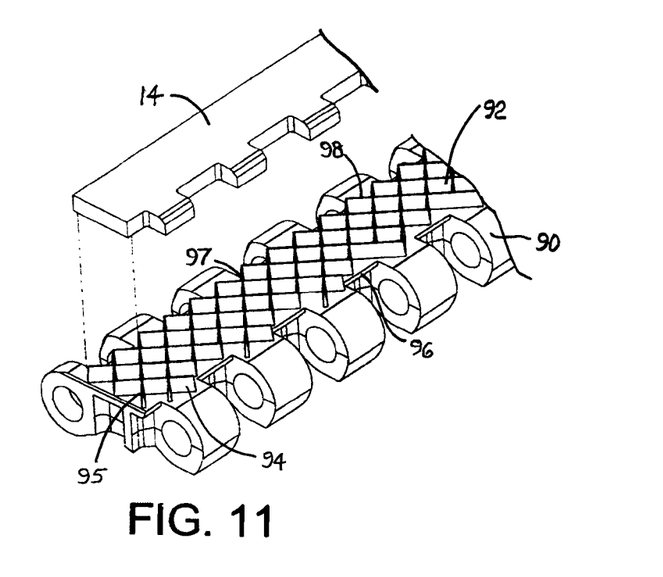
FIG. 11 is an exploded isometric view of a portion of yet another version of a belt module embodying features of the invention including a crisscross array of elongated teeth.

Another version of a rigid substrate is shown in FIG. 11. The substrate 90 has an array 92 of two sets of parallel elongated teeth 94, 95 intersecting in a crisscross pattern. Both sets of teeth are oblique to the opposite ends 96, 97 of the substrate in this example. The distal tip ends 98 of the teeth melt and blend with the high-friction layer 14 during the molding process.

Although the invention has been described with reference to a preferred version, other versions are possible. For example, the hinge elements do not have to be hinge eyes receiving separate hinge rods to form hinge joints; some of the hinge elements could include laterally extending stubs that are received in receptacles in interleaved hinge elements to form the hinge joints without using separate hinge rods. As another example, the teeth can be shaped differently, even irregularly, as long as their top ends are thin enough to melt during overmolding to mix with the high-friction layer. Furthermore, although the rigid substrate is preferably made by injection-molding, it could be formed by other conventional methods. So, as these few examples suggest, the scope of the claims is not meant to be limited to the preferred versions used as an exemplary description.

What is claimed is:

1. A conveyor belt module comprising:
a rigid link substrate molded of a low-friction plastic material and having hinge elements at opposite ends of the rigid link substrate for connecting hingedly with hinge elements of adjacent rigid link substrates, a load-bearing surface between the opposite ends of the rigid link substrate, and an array of thin teeth upstanding from the load-bearing surface, wherein each tooth has a base proximate the load-bearing surface and a distal tip end;
a high-friction layer made of a resilient material molded atop the load-bearing surface of the rigid link substrate at a temperature sufficiently high and applied long enough to melt the distal tip ends of the teeth in contact with the resilient material without melting the bases of the teeth during the molding of the high-friction layer onto the rigid link substrate and to cause the melted distal tip ends to mix with the resilient material to retain the high-friction layer atop the load-bearing surface.

2. A conveyor belt module as in claim 1 wherein the distal tip ends of the teeth define a common plane before the high-friction layer is molded on.

3. A conveyor belt module as in claim 1 wherein each of the teeth is triangular with a vertex at the distal tip end that melts when the high-friction layer is molded on.

4. A conveyor belt module as in claim 1 wherein each of the teeth includes a hook at the distal tip end that melts when the high-friction layer is molded on.

5. A conveyor belt module as in claim 1 wherein the array of teeth includes a plurality of rows of elongated teeth, each extending parallel to the opposite ends of the rigid link substrate from a first side of the rigid link substrate to an opposite second side.

6. A conveyor belt module as in claim 5 further comprising rows of elongated shorter teeth, wherein the rows of shorter teeth alternate with the rows of teeth.

7. A conveyor belt module as in claim 1 wherein the array of teeth includes a plurality of columns of elongated teeth, each extending perpendicular to the opposite ends of the rigid link substrate.

8. A conveyor belt module as in claim 7 further comprising columns of elongated shorter teeth, wherein the columns of shorter teeth alternate with the columns of teeth.

9. A conveyor belt module as in claim 1 wherein the array of teeth includes a first set of parallel elongated teeth intersecting a second set of parallel elongated teeth in a crisscross pattern.

10. A conveyor belt module as in claim 1 wherein the teeth are castellated elongated teeth.

11. A conveyor belt module as in claim 1 wherein the teeth are arranged in rows and columns forming a grid of channels between the rows and columns.

12. A conveyor belt module as in claim 1 wherein the resilient material melts at a higher temperature than the low-friction plastic material.

13. A conveyor belt module as in claim 1 wherein the density of the teeth is about 60 teeth/cm$^2$.

14. A conveyor belt module as in claim 1 further comprising teeth disposed on the hinge elements.

15. A conveyor belt module as in claim 1 wherein the distal tip ends of the teeth are less massive than the base so that the distal tip ends melt during the molding of the high-friction layer onto the rigid link substrate.

16. A conveyor belt comprising a plurality of conveyor belt modules as in claim 1 connected serially end to end at hinges formed by interleaved hinge elements of adjacent modules to form an endless loop.

17. A method for making a conveyor belt module with a resilient conveying surface layer, comprising:
molding a conveyor belt module substrate with an array of teeth upstanding from a load-bearing surface out of a low-friction first material having a melting temperature;
molding a resilient second material at a temperature above the melting temperature of the first material onto the array of teeth on the conveyor belt module substrate to melt tip ends of the teeth to mix with the second material forming a resilient conveying surface layer atop the conveyor belt module substrate.

* * * * *